United States Patent
Yi et al.

(10) Patent No.: US 11,360,941 B2
(45) Date of Patent: Jun. 14, 2022

(54) METHOD AND DEVICE FOR COMPRESSING AND DECOMPRESSING UNIT FILES FOR EPUB FILE ENCRYPTION

(71) Applicant: FASOO.COM CO., LTD., Seoul (KR)

(72) Inventors: Yeong Hun Yi, Seoul (KR); Kyo Young Chin, Gyeonggi-do (KR)

(73) Assignee: FASOO.COM CO., LTD., Seoul (KR)

( * ) Notice: Subject to any disclaimer, the term of this patent is extended or adjusted under 35 U.S.C. 154(b) by 203 days.

(21) Appl. No.: 16/066,520

(22) PCT Filed: Dec. 28, 2015

(86) PCT No.: PCT/KR2015/014361
§ 371 (c)(1),
(2) Date: Jun. 27, 2018

(87) PCT Pub. No.: WO2017/115884
PCT Pub. Date: Jul. 6, 2017

(65) Prior Publication Data
US 2019/0005060 A1    Jan. 3, 2019

(51) Int. Cl.
*G06F 16/11* (2019.01)
*G06F 21/60* (2013.01)
(Continued)

(52) U.S. Cl.
CPC .......... *G06F 16/1744* (2019.01); *G06F 16/00* (2019.01); *G06F 16/113* (2019.01);
(Continued)

(58) Field of Classification Search
CPC .... G06F 16/1744; G06F 16/00; G06F 16/113; G06F 21/10; G06F 21/602; H04L 9/14
See application file for complete search history.

(56) References Cited

U.S. PATENT DOCUMENTS

2006/0143252 A1* 6/2006 Perterson ................ G06F 16/00
2011/0246776 A1* 10/2011 Deaver .................. H04N 5/913
                                                          713/168

(Continued)

FOREIGN PATENT DOCUMENTS

KR    1020110073149 A     6/2011
KR    1020130056582 A     5/2013

(Continued)

OTHER PUBLICATIONS

International Search Report for PCT/KR2015/014361 from the Korean Intellectual Property Office, 12 pages.

*Primary Examiner* — Noura Zoubair
(74) *Attorney, Agent, or Firm* — AJU Kim Chang & Lee

(57) ABSTRACT

Disclosed are a method and a device for compressing and decompressing unit files when encrypting an electronic publication (EPUB) file. The method for compressing unit files for EPUB file encryption comprises: a step of determining an encryption target unit file from among a plurality of unit files forming an EPUB file; a step of performing encryption of the compressed encryption target unit file; and a step of performing compression of general unit files among the plurality of unit files in addition to the encryption target unit file. As such, by performing compression of the encryption target unit file before the general unit files, it is possible to effectively reduce the size of a single packaged EPUB file.

15 Claims, 7 Drawing Sheets

(51) Int. Cl.
*H04L 9/14* (2006.01)
*G06F 16/174* (2019.01)
*G06F 21/10* (2013.01)
*G06F 16/00* (2019.01)

(52) U.S. Cl.
CPC ............ *G06F 21/10* (2013.01); *G06F 21/602* (2013.01); *H04L 9/14* (2013.01); *G06F 2221/2107* (2013.01); *H04L 2209/30* (2013.01)

(56) References Cited

U.S. PATENT DOCUMENTS

| | | |
|---|---|---|
| 2012/0226738 A1 | 9/2012 | Taneja et al. |
| 2013/0139052 A1 | 5/2013 | Rong et al. |
| 2015/0029002 A1* | 1/2015 | Yeakley ............. G06K 7/10237 340/10.51 |

FOREIGN PATENT DOCUMENTS

| | | |
|---|---|---|
| KR | 101287518 B1 | 8/2013 |
| KR | 101435891 B1 | 9/2014 |
| WO | 2014/142528 A1 | 9/2014 |

* cited by examiner

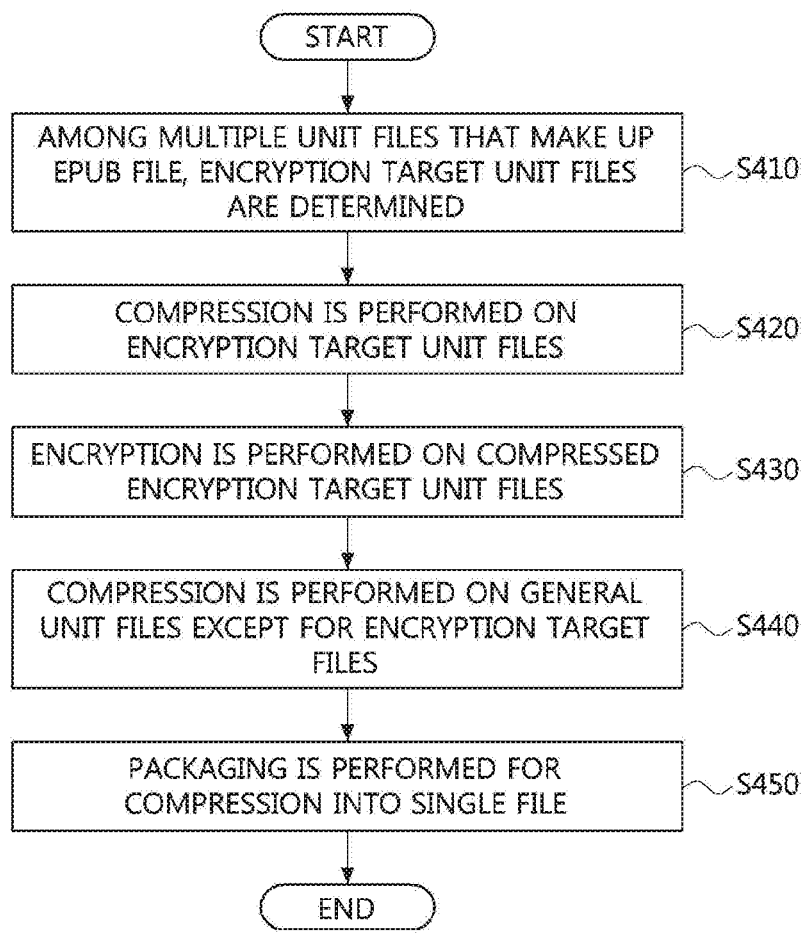

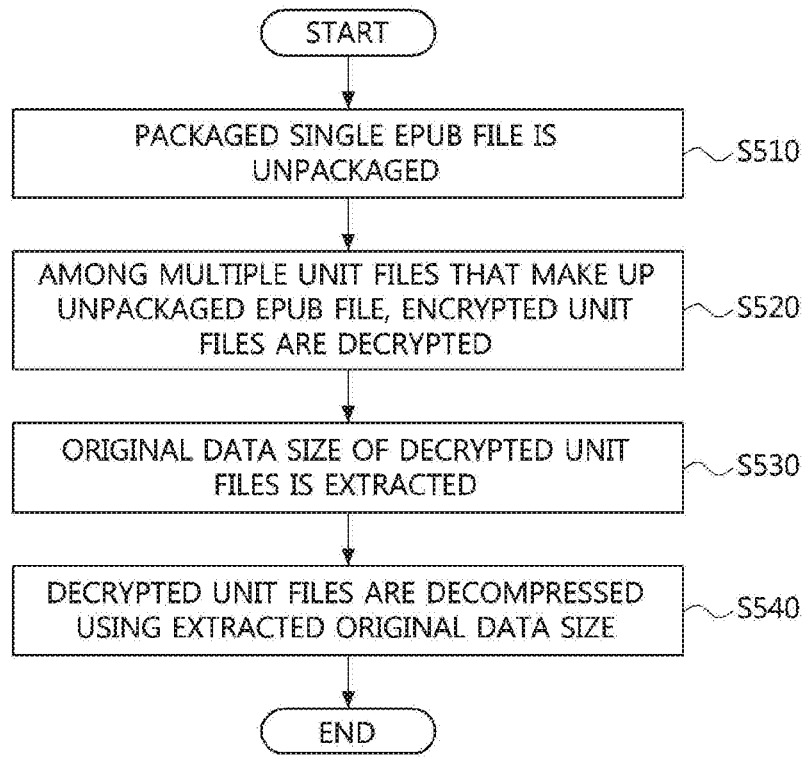
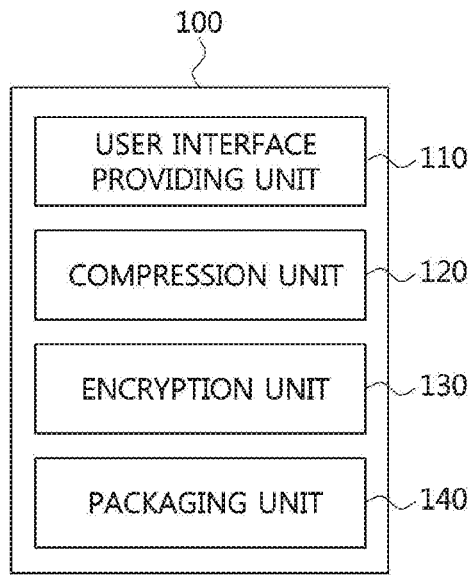

METHOD AND DEVICE FOR COMPRESSING AND DECOMPRESSING UNIT FILES FOR EPUB FILE ENCRYPTION

TECHNICAL FIELD

The present invention relates to EPUB file encryption. More particularly, the present invention relates to a method and device for compressing and decompressing unit files in encryption of an EPUB file.

BACKGROUND ART

Electronic publication (EPUB) is a free and open electronic book standard adopted as an official standard of the International Digital Publishing Forum (IPDF) in September 2007, superseding the older Open eBook standard. The EPUB is designed to be reflowable such that it is provided to a user being automatically optimized according to the type and size of display device.

The EPUB specification consists of definitions, such as Open Publication Structure (OPS), Open Packaging Format (OPF), OEBPS Container Format (OCF), and the like. OPS is the definition of the top level in the EPUB format, and consists of the definition of modularized configuration specification of the EPUB contents, the definition of a style sheet, and definitions of limited use of XHTML or XML.

OPF defines a mechanism for metadata published in the OCF, reading order, and operation of information search in accordance with the OCF standards. OCF specifies a general definition of container technology for the EPUB contents.

In terms of a physical configuration of the EPUB file, the EPUB is a single file format having filename extension .epub, and is a format in which several elements (directory and file) are compressed in the single file format by a compression mechanism.

However, in the case where encryption is required for all or some of the multiple unit files that make up the EPUB file, when the relevant unit files are encrypted, in spite of compression into a single file format by the compression mechanism, the size of the file is not reduced, and thus compression efficiency is degraded.

DISCLOSURE

Technical Problem

In order to solve the above problems, the purpose of the present invention is to provide a method for compressing and decompressing unit files when encrypting an EPUB file.

In order to solve the above problems, another purpose of the present invention is to provide an apparatus for compressing and decompressing unit files when encrypting an EPUB file.

Technical Solution

According to an aspect of the present invention for achieving the above purpose, a method of compressing unit files for electronic publication (EPUB) file encryption includes determining encryption target unit files among multiple unit files that make up an EPUB file, performing compression on encryption target unit files, performing encryption on compressed encryption target unit files, and performing compression on general unit files of multiple unit files except for encryption target unit files.

Here, the method may further include performing compression into a single file by performing packaging after the performing of compression on the general unit files.

Here, at the performing of encryption on compressed encryption target unit files, encryption may be performed using different encryption keys with respect to compressed encryption target unit files.

Here, at the performing of encryption on compressed encryption target unit files, mapping data in which the encryption keys and identification information of compressed encryption target unit files are mapped may be generated and stored.

Here, at the performing of compression into a single file, an original data size of encryption target unit files may be recorded in accordance with EPUB standards.

Here, at the performing of compression into a single file, the original data size of the encryption target unit files may be specified in encryption.xml.

According to another aspect of the present invention for achieving the above purpose, a method of decompressing multiple unit files that make up an electronic publication (EPUB) file includes unpackaging a packaged single EPUB file, decrypting encrypted unit files among multiple unit files that make up an unpackaged EPUB file, and decompressing decrypted unit files after extracting an original data size of decrypted unit files.

Here, at the decrypting of the encrypted unit files among multiple unit files, the encrypted unit files may be decrypted using different decryption keys with respect to the encrypted unit files.

Here, at the decompressing of the decrypted unit files, an original data size of decrypted unit files may be extracted from a path in accordance with EPUB standards, and decrypted unit files may be decompressed.

Here, at the decompressing of the decrypted unit files, an original data size of decrypted unit files is read from encryption.xml, and decrypted unit files are decompressed.

In order to achieve the above another purpose, an embodiment of the present invention provides a computer-readable recording medium recording a program for executing a method of compressing a unit file for an electronic publication (EPUB) file on a computer.

Advantageous Effects

The method and device for compressing and decompressing unit files in encryption of the EPUB file according to the embodiment of the present invention effectively reduces the size of the packaged single EPUB file by performing compression on the encryption target unit file first Also, by specifying the original data size of the encryption target unit files in the encryption.xml, the packaged single EPUB file is effectively decompressed.

DESCRIPTION OF DRAWINGS

FIG. 4 is a flowchart illustrating a compression mechanism when encryption is applied to an EPUB file according to an embodiment of the present invention.

FIG. 5 is a flowchart illustrating a decompression mechanism when encryption is applied to an EPUB file according to an embodiment of the present invention.

FIG. 6 is a block diagram illustrating a device of performing a compression mechanism when encryption is applied to an EPUB file according to an embodiment of the present invention.

FIG. 7 is a diagram illustrating an example of specification of the encryption.xml according to an embodiment of the present invention.

FIG. 8 is a diagram illustrating an example of a user interface of a device of performing a compression mechanism when encryption is applied to an EPUB file according to an embodiment of the present invention.

BEST MODE

Figure 1:
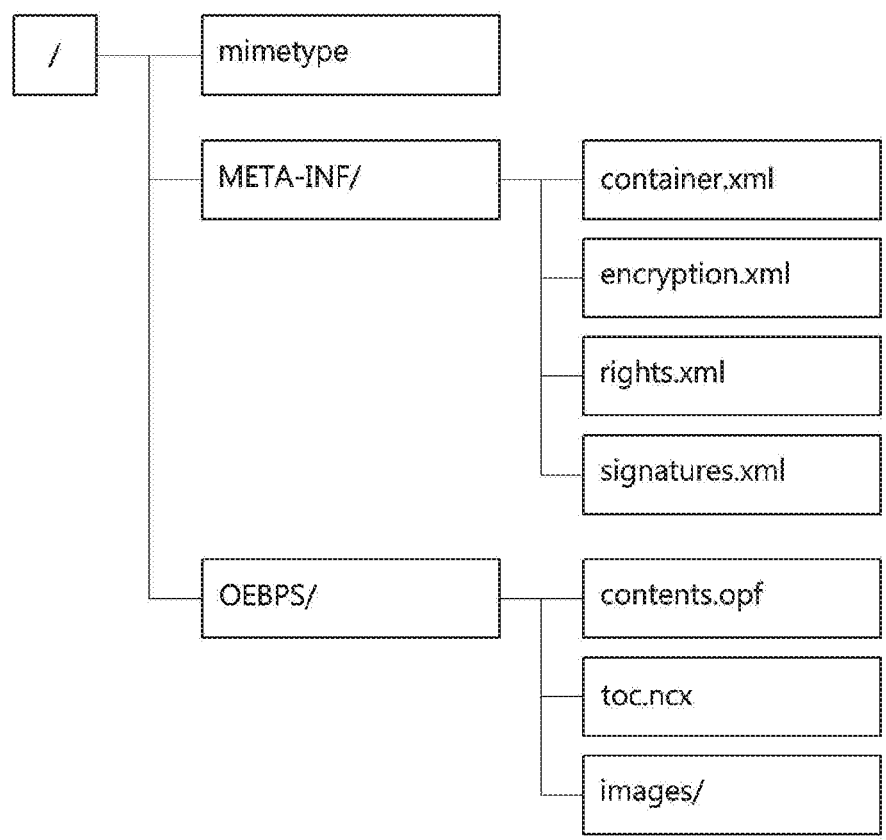
FIG. 1 is a diagram illustrating a directory structure of an EPUB file.

The present invention may be variously modified and may include various embodiments. However, particular embodiments are exemplarily illustrated in the drawings and will be described in detail. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout the description of the drawings.

Relational terms such as first, second, A, B, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is not for delimiting the present invention but for describing the specific embodiments. The terms of a singular form may include plural forms unless otherwise specified. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings.

FIG. 1 is a diagram illustrating a directory structure of an EPUB file.

In terms of a physical configuration of the EPUB file, the EPUB is a single file format with filename extension .epub, and is a format in which several elements (directory and file) are compressed into a single file format by a compression mechanism.

Referring to FIG. 1, the root of the EPUB file includes a "mimetype" file, a META-INF directory, and an OEBPS directory.

The EPUB file structure has a file called mimetype in it's the top-level folder, which is used as an identifier for distinguishing a general compression file and an EPUB standard compression file.

The META-INF directory is a meta information directory for structure information, copyright information, encryption information, and the like on an electronic book, and the folder contains a container.xml file. Also, the META-INF directory may further contain files (manifest.xml, metadata.xml, signatures.xml, encryption.xml, and rights.xml) having document structure information, additional information, electronic signature information, encryption information, and copyright information.

Specifically, the container.xml file is a file referenced first by an electronic book reader, which contains location information of contents.opf that contains structure (OPF) information on the actual contents of the electronic book. Here, the contents.opf file provides a list of all files in the EPUB container, and stores file sequence definition metadata information therein.

The encryption.xml is in the top level (META-INF/) of the container file system and contains all pieces of encryption information for the contents of the EPUB container.

The signatures.xml is also in the top level (META-INF/) of the container file system, and contains electronic signature information on the container and contents.

The format of the rights.xml is to show information on the DRM license contents.

Further, a toc.ncx file is related to the book's table of contents, and ncx supports a multi-level navigation function.

Figure 2:
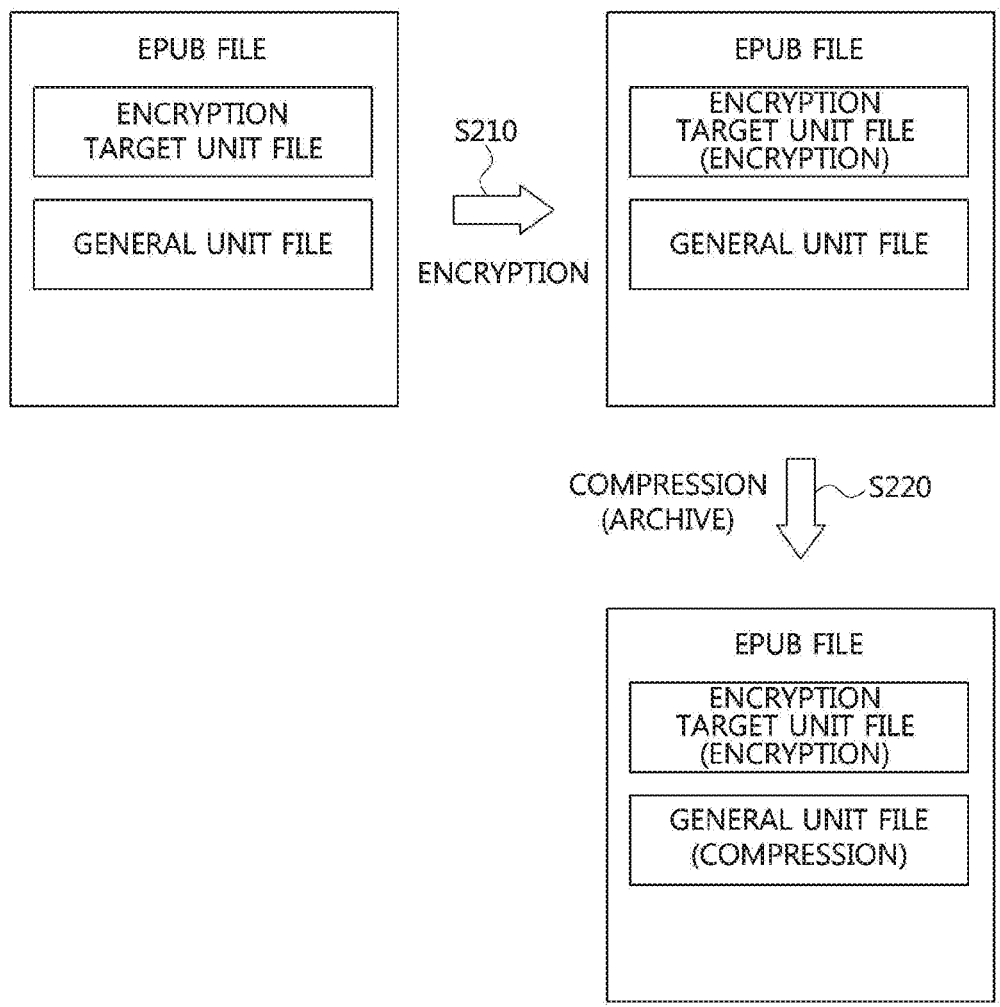
FIG. 2 is a diagram illustrating an example of a compression mechanism when encryption is applied to an EPUB file.
Figure 3:
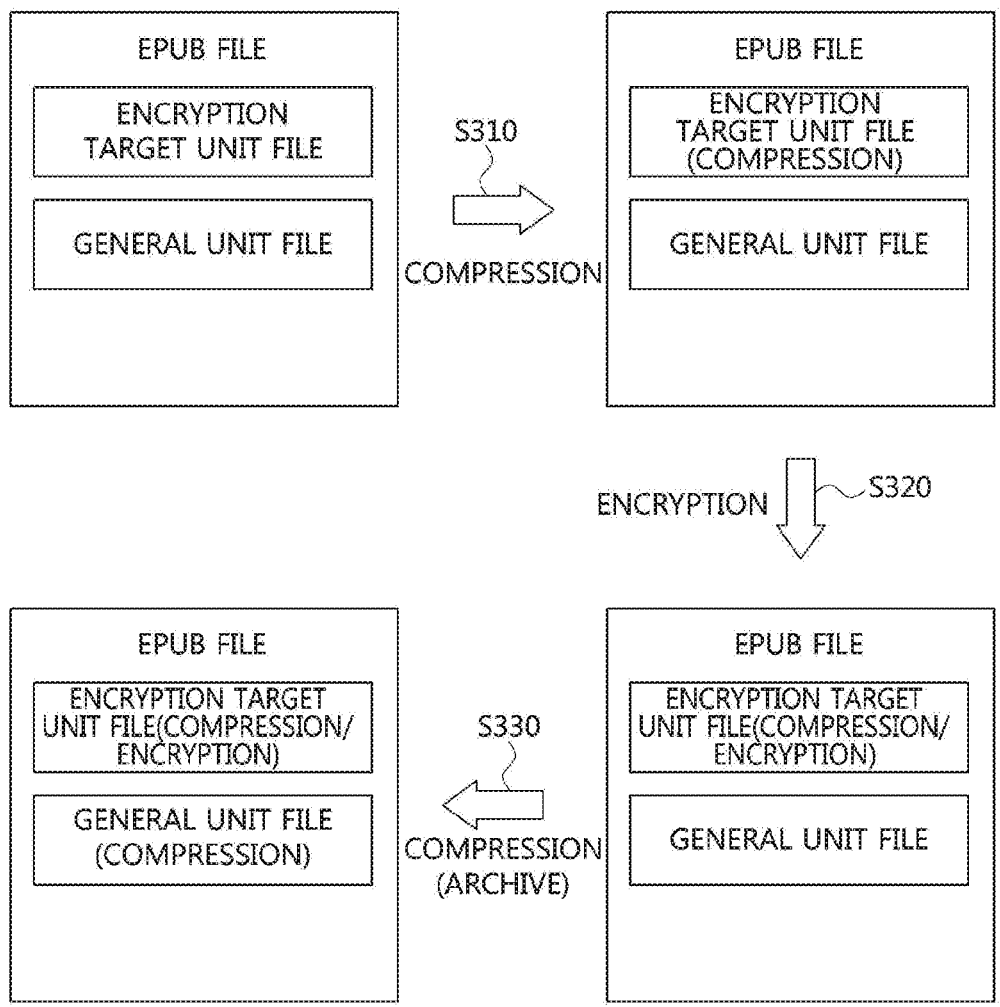
FIG. 3 is a diagram illustrating an example of a compression mechanism when encryption is applied to an EPUB file according to an embodiment of the present invention.

FIG. 2 is a diagram illustrating an example of a compression mechanism when encryption is applied to an EPUB file. FIG. 3 is a diagram illustrating an example of a compression mechanism when encryption is applied to an EPUB file according to an embodiment of the present invention.

Referring to FIG. 2, the EPUB file may be composed of multiple unit files, and the multiple unit files may be classified into an encryption target unit file and a general unit file. Here, the encryption target unit file may refer to a unit file designated as a target of encryption, and the general unit file may refer to a unit file not designated as a target of encryption. For example, multiple unit files may include various data formats such as text files, image files, video files, and the like, and among these, unit files that require encryption may be selected or determined.

When some of the multiple unit files that make up the EPUB file are designated as encryption targets, generally, a compression mechanism is performed after encryption.

Specifically, encryption may be performed on the encryption target files among the multiple unit files that make up the EPUB file at step S210. After encryption of the encryption target files, compression and packaging are performed on the general unit files such that a single file in the archive format is generated at step S220.

However, as shown in FIG. 2, when the compression mechanism is performed after encryption of the encryption target unit files, encryption efficiency for the encryption target unit files is degraded and the files does not decrease in size effectively.

Referring to FIG. 3, when some of the multiple unit files that make up the EPUB file are designated as encryption targets, compression of the encryption target unit files is performed first, and then the encryption mechanism is performed.

Specifically, compression may be performed on encryption target file among the multiple unit files that make up the EPUB file at step S310. After compression of the encryption target unit files, encryption may be performed on the encryption target unit files at step S320. Also, after compression and encryption of the encryption target unit files, compression and packaging are performed on the general unit files such that a single file in the archive format is generated at step S330.

Accordingly, when packaging is performed on the EPUB file by the mechanism as shown in FIG. 3, compression is performed on the encryption target unit file, and thus the packaged single file is effectively reduced in size.

FIG. 4 is a flowchart illustrating a compression mechanism when encryption is applied to an EPUB file according to an embodiment of the present invention.

Referring to FIG. 4, the method of compressing the unit files for electronic publication (EPUB) file encryption may be performed by a packager operated by an online service provider or the like, but the present invention is not limited to this embodiment.

Among the multiple unit files that make up the EPUB file, the encryption target unit files may be determined at step S410. For example, among the multiple unit files that make up the EPUB file, the encryption target unit files may be automatically determined by the packager according to a preset criterion, or may be determined by choice of the operator that operates the packager.

Compression may be performed on the encryption target unit files at step S420, and encryption may be performed on the compressed encryption target unit files at step S430.

Specifically, using different encryption keys with respect to the compressed encryption target unit files, encryption may be performed on the compressed encryption target unit files. Also, mapping data in which the encryption keys and identification information of the compressed encryption target unit files are mapped may be generated, stored, and managed.

Compression may be performed on the general unit files of the multiple unit files except for the encryption target unit files at step S440. After compression of the general unit files, packaging is performed for compression into a single file at step S450.

Also, in compression into the single file, the original data size of the encryption target unit files may be recorded in accordance with the EPUB standards. That is, the original data size of the encryption target unit files is indispensable for performing decompression (recovery), and thus it is necessary to specify the original data size of the encryption target unit files. For example, the original data size of the encryption target unit files may be specified in the encryption.xml.

FIG. 5 is a flowchart illustrating a decompression mechanism when encryption is applied to an EPUB file according to an embodiment of the present invention.

Referring to FIG. 5, the single EPUB file which is packaged according to the method described with reference to FIG. 4 may be transmitted to a user terminal via the online service provider or the like. The user terminal may decompress the packaged single EPUB file using the EPUB viewer which is capable of displaying the packaged single EPUB file. A method of decompressing the EPUB file, which is performed by the EPUB viewer, will be described as follows.

First, the packaged single EPUB file may be unpackaged at step S510. That is, by unpackaging, the single EPUB file may be divided into the multiple unit files.

Among the multiple unit files that make up the unpackaged EPUB file, the encrypted unit files may be decrypted at step S520. For example, on the basis of the above-described mapping data, decryption may be performed using decryption keys with respect to the encrypted unit files. That is, the encrypted unit files may be decrypted using different decryption keys of the encrypted unit files.

The original data size of the decrypted unit files may be extracted at step S530, and the decrypted unit files may be decompressed on the basis of the extracted original data size at step S540. Specifically, the original data size of the decrypted unit files may be extracted from a path in accordance with the EPUB standards, and the decrypted unit files may be decompressed. For example, the original data size of the decrypted unit files may be read from the encryption.xml, and the decrypted unit files may be decompressed.

Figure 7:
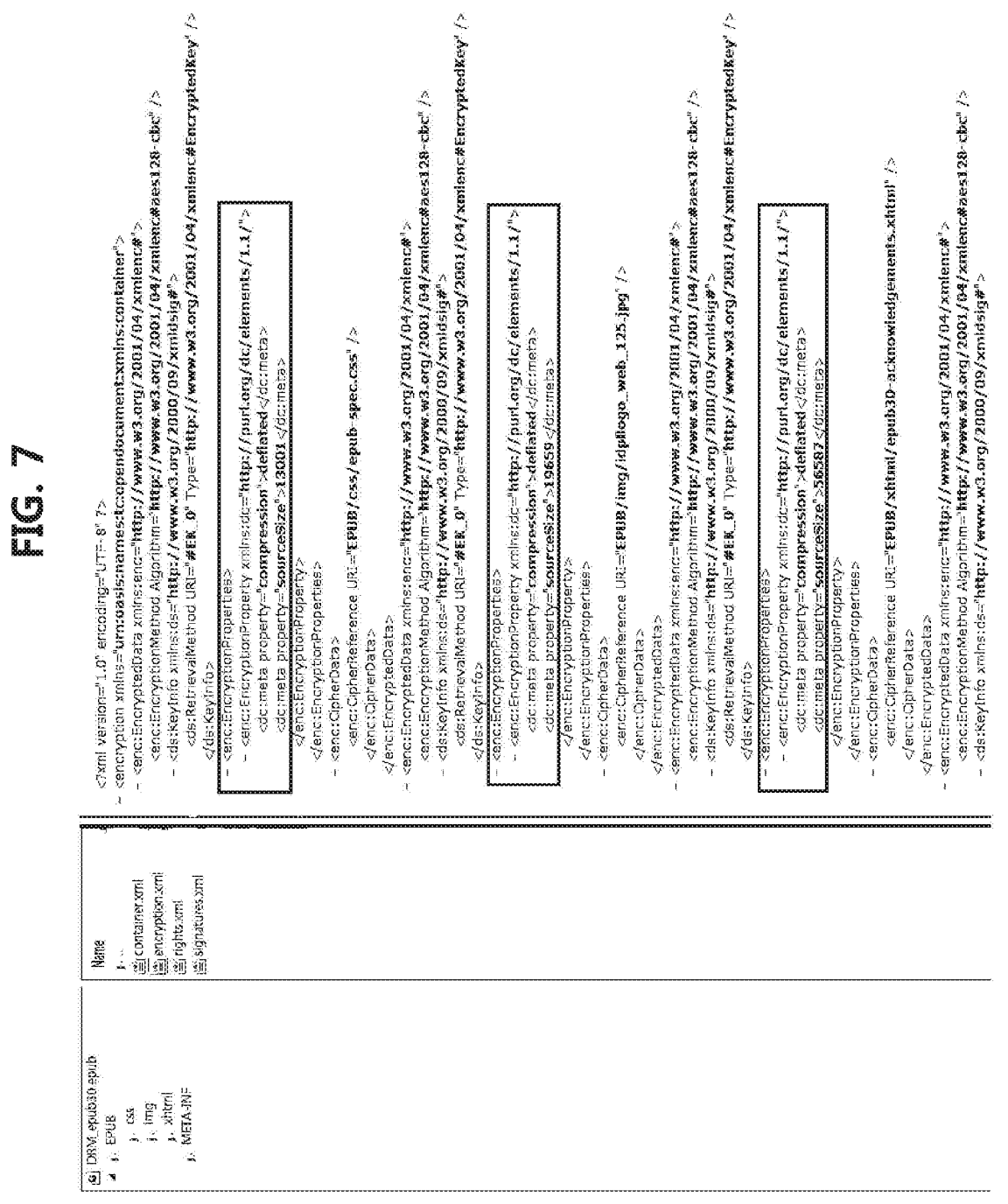
Figure 8:
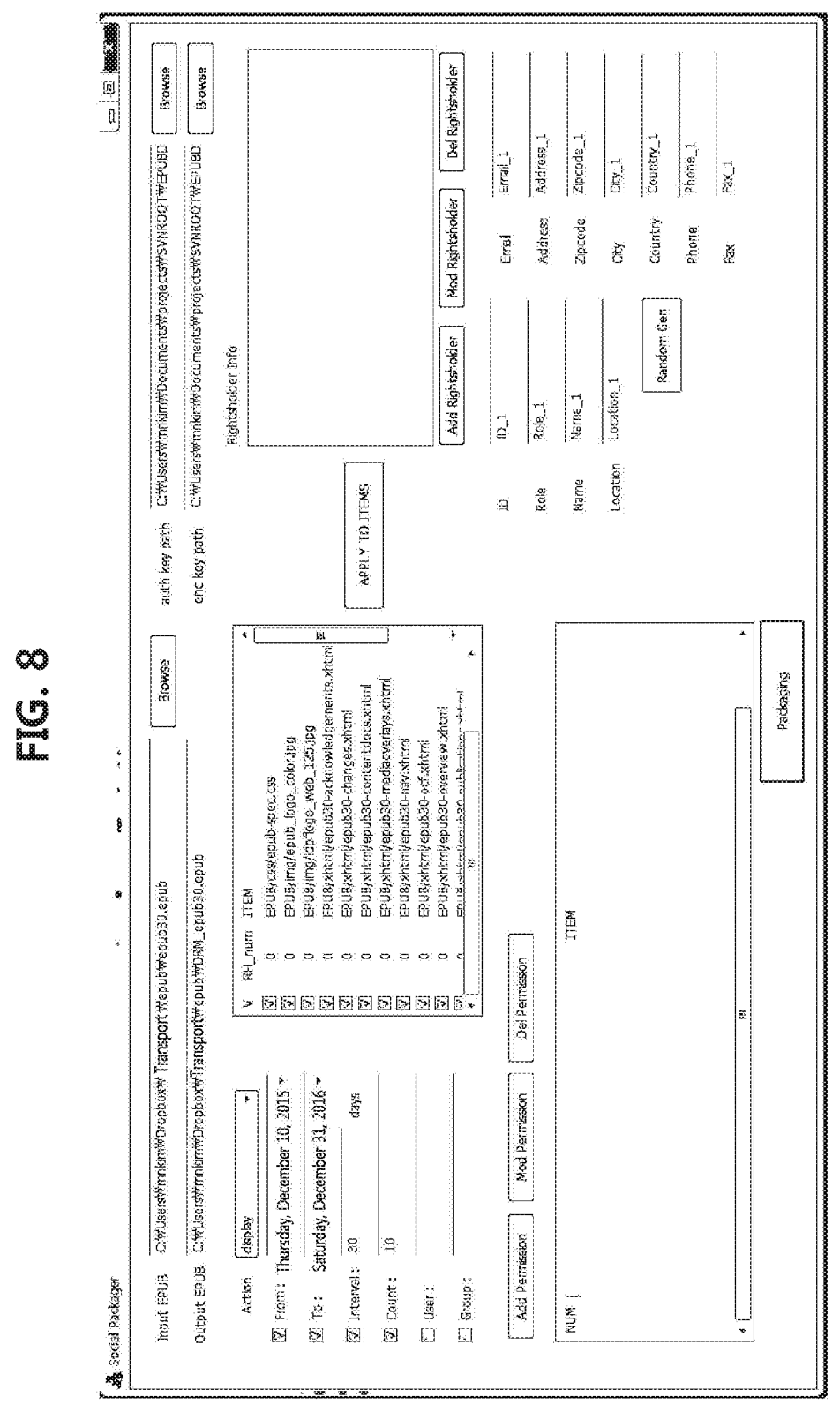

FIG. 6 is a block diagram illustrating a device of performing a compression mechanism when encryption is applied to an EPUB file according to an embodiment of the present invention. FIG. 7 is a diagram illustrating an example of specification of the encryption.xml according to an embodiment of the present invention. FIG. 8 is a diagram illustrating an example of a user interface of a device of performing a compression mechanism when encryption is applied to an EPUB file according to an embodiment of the present invention.

Referring to FIG. 6, when encryption is applied to the EPUB file, a device 100 for performing the compression mechanism may be the packager operated by the online service provider or the like, but the present invention is not limited to this embodiment.

According to an embodiment of the present invention, the device 100 for performing the compression mechanism, when encryption is applied to the EPUB file, includes: a user interface providing unit 110; a compression unit 120; an encryption unit 130; and a packaging unit 140.

The user interface providing unit 110 may provide a user interface for generating the single EPUB file by packaging the EPUB file.

Specifically, FIG. 8 shows an example of a user interface provided by the user interface providing unit 110. Referring to FIG. 8, the service provider may select or set unit files that requires packaging or unit files that requires encryption. Accordingly, the service provider may determine encryption target unit files among multiple unit files that make up the EPUB file.

The compression unit 120 may perform compression on the encryption target unit files.

The encryption unit 130 may perform encryption on the compressed encryption target unit files. Specifically, the encryption unit 130 may perform encryption on the compressed encryption target unit files using different encryption keys with respect to the compressed encryption target unit files. Also, the encryption unit 130 may generate, store, and manage the mapping data in which the encryption keys and the identification information of the compressed encryption target unit files are mapped.

The packaging unit 140 may perform compression on general unit files of the multiple unit files except for the encryption target unit files, and then may perform packaging for compression into a single file.

Also, in compression into the single file, the packaging unit 140 may record the original data size of the encryption target unit files in accordance with the EPUB standards. That is, the original data size of the encryption target unit files is indispensable for performing decompression (recovery), and thus it is necessary to specify the original data size of the encryption target unit files.

For example, referring to FIG. 7, the original data size of the encryption target unit files may be specified in the encryption.xml. Specifically, the encryption.xml is in the top level (META-INF/) of the container file system and contains all pieces of encryption information for the contents of the EPUB container. Therefore, the original data size of the encryption target unit files may be specified in the encryption.xml as shown in FIG. 7.

The respective constituent elements of the device 100 for performing the compression mechanism when encryption is applied to the EPUB file according to the embodiment of the present invention have been listed and described as respective constituent elements to facilitate the description. At least two of the constituent elements may be combined to one constituent element or one constituent element may be divided into a plurality of constituent elements to carry out the function. Embodiments in which the constituent elements are integrated or divided are included within the technical scope of the present invention without departing from the gist of the present invention.

Also, an operation of the device 100 for performing the compression mechanism when encryption is applied to the EPUB file according to the embodiment of the present invention may be realized as computer-readable programs or codes in a computer-readable recording medium. The computer-readable recording mediums include all types of recording devices in which data readable by computer systems are stored. The computer-readable recording mediums may be distributed to computer systems connected via networks and the computer-readable programs or codes may be stored and executed in a distribution manner.

The method and device for compressing and decompressing unit files in encryption of the EPUB file according to the embodiment of the present invention effectively reduces the size of the packaged single EPUB file by performing compression on the encryption target unit file first.

Also, by specifying the original data size of the encryption target unit files in the encryption.xml, the packaged single EPUB file is effectively decompressed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method comprising:
    determining at least two unit files to be encrypted in a multi-unit file, wherein the multi-unit file comprises a plurality of unit files, and wherein the plurality of unit files comprises the at least two unit files to be encrypted and at least one unit file to remain unencrypted;
    compressing the at least two unit files to be encrypted prior to encryption of the at least two unit files to be encrypted;
    encrypting the at least two unit files to be encrypted after the compressing the at least two unit files to be encrypted, wherein the encrypting the at least two unit files to be encrypted comprises using different encryption keys for each of the at least two unit files to be encrypted;
    compressing the at least one unit file to remain unencrypted; and
    compressing the plurality of unit files into a single file after the encrypting the at least two unit files to be encrypted and after the compressing the at least one unit file to remain unencrypted, wherein the single file comprises a meta information directory comprising an original data size of the at least two unit files to be encrypted.

2. The method of claim 1, wherein the encrypting the at least two unit files to be encrypted comprises mapping the different encryption keys and identification information of the compressed at least two unit files to be encrypted in the meta information directory.

3. The method of claim 1, wherein the multi-unit file is an electronic publication (EPUB) file.

4. The method of claim 1, wherein the compressing the plurality of unit files into the single file comprising packaging the at least two unit files to be encrypted and the at least one unit file to remain unencrypted.

5. The method of claim 4, wherein the packaging the at least two unit files to be encrypted and the at least one unit file to remain unencrypted comprises the compressing the at least one unit file to remain unencrypted.

6. A non-transitory computer-readable recording medium having a program recorded thereon, wherein execution of the program comprises:
    determining at least two unit files to be encrypted in a multi-unit file, wherein the multi-unit file comprises a plurality of unit files, and wherein the plurality of unit files comprises the at least two unit files to be encrypted and at least one unit file to remain unencrypted;
    compressing the at least two unit files to be encrypted prior to encryption of the at least two unit files to be encrypted;
    encrypting the at least two unit files to be encrypted after the compressing the at least two unit files to be encrypted, wherein the encrypting the at least two unit files to be encrypted comprises using different encryption keys for each of the at least two unit files to be encrypted;
    compressing the at least one unit file to remain unencrypted; and
    compressing the plurality of unit files into a single file after the encrypting the at least two unit files to be encrypted and after the compressing the at least one unit file to remain unencrypted, wherein the single file comprises a meta information directory comprising an original data size of the at least two unit files to be encrypted.

7. The non-transitory computer-readable recording medium of claim 6, wherein the encrypting the at least two unit files to be encrypted comprises mapping the different encryption keys and identification information of the compressed at least two unit files to be encrypted in the meta information directory.

8. The non-transitory computer-readable recording medium of claim 6, wherein the multi-unit file is an electronic publication (EPUB) file.

9. The non-transitory computer-readable recording medium of claim 6, wherein the compressing the plurality of unit files into the single file comprising packaging the at least two unit files to be encrypted and the at least one unit file to remain unencrypted.

10. The non-transitory computer-readable recording medium of claim 9, wherein the packaging the at least two unit files to be encrypted and the at least one unit file to remain unencrypted comprises the compressing the at least one unit file to remain unencrypted.

11. A method comprising:
- identifying at least one unit file that was unencrypted and at least two unit files that were encrypted in a multi-unit file, wherein the multi-unit file comprises a plurality of unit files, and wherein the plurality of unit files comprises the at least one unit file that was unencrypted and the at least two unit files that were encrypted;
- decompressing the plurality of unit files from a single file, wherein the single file comprises a meta information directory comprising an original data size of the at least two unit files that were encrypted;
- decompressing the at least unit file that was unencrypted in the multi-unit file after decompressing the plurality of unit files from the single file;
- decrypting the at least two unit files that were encrypted after decompressing the plurality of unit files from the single file and prior to decompression of the at least two unit files that were encrypted, wherein the decrypting the at least two unit files that were encrypted comprises using different encryption keys for each of the at least two unit files that were encrypted; and
- decompressing the at least two unit files that were encrypted after the decrypting the at least two unit files that were encrypted.

12. The method of claim 11, wherein the decrypting the at least two unit files that were encrypted comprises identifying the different encryption keys and identification information of the decompressed at least two unit files that were encrypted.

13. The method of claim 11, wherein the multi-unit file is an electronic publication (EPUB) file.

14. The method of claim 11, comprising unpackaging the at least two unit files that were encrypted and the at least one unit file that was unencrypted, wherein the unpackaging comprises the decompressing the plurality of unit files from the single file.

15. The method of claim 14, wherein the unpackaging the at least two unit files that were encrypted and the at least one unit file that was unencrypted comprises the decompressing the at least one unit file that was unencrypted.

* * * * *